US008410631B2

(12) United States Patent
Chakam

(10) Patent No.: US 8,410,631 B2
(45) Date of Patent: Apr. 2, 2013

(54) METHOD FOR TRANSMITTING AND/OR RECEIVING SIGNALS FOR AT LEAST A FIRST AND A SECOND DIFFERENT SERVICE, PARTICULARLY IN A VEHICLE

(75) Inventor: Guy-Aymar Chakam, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 338 days.

(21) Appl. No.: 12/746,573

(22) PCT Filed: Nov. 28, 2008

(86) PCT No.: PCT/EP2008/066434

§ 371 (c)(1), (2), (4) Date: Aug. 11, 2010

(87) PCT Pub. No.: WO2009/071490

PCT Pub. Date: Jun. 11, 2009

(65) Prior Publication Data

US 2010/0317337 A1 Dec. 16, 2010

(30) Foreign Application Priority Data

Dec. 7, 2007 (DE) ........................ 10 2007 058 985

(51) Int. Cl.
*B60L 1/00* (2006.01)

(52) U.S. Cl. ........................................................ 307/9.1

(58) Field of Classification Search .................... 307/9.1
See application file for complete search history.

(56) References Cited

U.S. PATENT DOCUMENTS 5,722,058 A 2/1998 Umemoto et al. ............ 455/140
6,340,928 B1 * 1/2002 McCurdy ...................... 340/436
6,400,040 B1 6/2002 Scudder et al. .............. 307/10.2
7,034,758 B2 4/2006 Haidacher et al. ............ 343/725
2008/0150712 A1 * 6/2008 Cooprider et al. ............ 340/447
2010/0148986 A1 6/2010 Aunkofer et al. ........ 340/825.69

FOREIGN PATENT DOCUMENTS

DE 10110289 9/2001
DE 10330087 1/2005
GB 2380876 4/2003
JP 8144597 6/1996
JP 1084588 3/1998
WO 2006127441 11/2006
WO 2008107430 9/2008

OTHER PUBLICATIONS

International Search Report and Written Opinion for Application No. PCT/EP2008/066434 (14 pages), Apr. 7, 2009.

* cited by examiner

*Primary Examiner* — Robert L. Deberadinis
(74) *Attorney, Agent, or Firm* — King & Spalding L.L.P.

(57) ABSTRACT

In a method for transmitting and/or receiving signals for at least one first and one second different service, particularly having a large range in a vehicle, at least one first antenna 25' transmits and/or receives signals for the at least one first or second service, depending on a detectable event, and an antenna module performs this method.

20 Claims, 3 Drawing Sheets

METHOD FOR TRANSMITTING AND/OR RECEIVING SIGNALS FOR AT LEAST A FIRST AND A SECOND DIFFERENT SERVICE, PARTICULARLY IN A VEHICLE

CROSS-REFERENCE TO RELATED APPLICATIONS

This application is a U.S. National Stage Application of International Application No. PCT/EP2008/066434 filed Nov. 28, 2008, which designates the United States of America, and claims priority to German Application No. 10 2007 058 985.0 filed Dec. 7, 2007, the contents of which are hereby incorporated by reference in their entirety.

TECHNICAL FIELD

Invention relates to a method for transmitting and/or receiving signals for least one first and one second different service, especially over a long-range (for example greater than 1 km) in a vehicle, as well as to an antenna module for executing this method.

BACKGROUND

Methods of this type are employed in automotive technology, in which ever more radio services, such as Remote Keyless Entry (RKE), exterior and interior monitoring system (PASS or PAssive Start and Entry), engine start, immobilizer control, central locking control, tire checking system (Tire Guard) mobile telephone, satellite-based global positioning system (GPS), SDARS, DAB, DBV-T, DBV-S, WLAN etc. are used.

In order to support the different radio services (terrestrial or by satellite) in the vehicle in a simple and convenient manner, the provision of a multifunctional antenna on the vehicle is known for example from DE 10330087 B3.

However it remains a considerable effort to cater for all services even if such a multifunctional antenna is used. In particular the coupling of the individual antennas, which with small distances, especially smaller than 0.1λ, for antennas in the same frequency range and at the same polarization is not possible.

SUMMARY

According to various embodiments, a method for transmitting and/or receiving signals for at least one first and one second different service over a long range in a vehicle as well as an antenna module for this can be created, which with full functionality allows a more simple construction and improved system performance of an antenna module and thereby solves the coupling problems of the antennas.

According to an embodiment, a method for transmitting and/or receiving signals for at least one first and one second different service, especially with a long range, in a vehicle, wherein an at least one first antenna transmits and/or receives signals as a function of a detectable event exclusively for the at least first or second service.

According to a further embodiment, the result of a query as to whether an authorized person is in the vehicle can be used as the detectable event. According to a further embodiment, signals of the at least one first or second service, of which the signals, as a function of the detectable event, are not transmitted and/or received via the first antenna, can be transmitted and/or received via the second antenna. According to a further embodiment, the signals of the at least one first and second services essentially may use the same frequency range. According to a further embodiment, a mobile telephone service can be used as the first service and an access control system service can be used as the second service, with the signals of the telephone service at least not being permanently transmitted and/or received via the first, especially external vehicle antenna if an authorized person is not located in the vehicle and the telephone service being permanently switched on when an authorized person is located in the vehicle. According to a further embodiment, a third service can be connected to the least one first antenna such that, on occurrence of a further detectable event the at least one first antenna exclusively transmits and/or receives signals for the third service. According to a further embodiment, an E-call service can be used as the third service. According to a further embodiment, the detection of an accident occurring to the vehicle can be used as the further detectable event.

According to another embodiment, an antenna module for carrying out the method as described above may comprise at least one first, especially vehicle-external, antenna, and a controllable switch which has at least one first and one second signal input for an available service in each case and at least one first signal output which is connected or linked to the first antenna, with the controllable switch having at least one first switch position in which the first signal output is only connected to the first signal input and the least one second switch position in which the first signal output is only connected to the second signal input.

According to a further embodiment of the antenna module, the antenna module may have a second, especially vehicle-internal antenna connected or coupled to a second signal output of the switch whereby, in a switch position of the switch the first signal input is exclusively connected to the first antenna and the second signal input is exclusively connected to the second antenna. According to a further embodiment of the antenna module, the controllable changeover switch may feature a third signal input for a third available service, whereby the controllable switch also has a third switch position in which the first signal output is only connected to the third signal input. According to a further embodiment of the antenna module, a module for executing the third service may also be connected via a coupling device to the first signal input, so that in the first switch position the first signal output is connected to the first signal input.

BRIEF DESCRIPTION OF THE DRAWINGS

The invention will be explained below in greater detail with reference to an exemplary embodiment shown in the drawing.

In the drawing the figures show.

DETAILED DESCRIPTION

Figure 1:
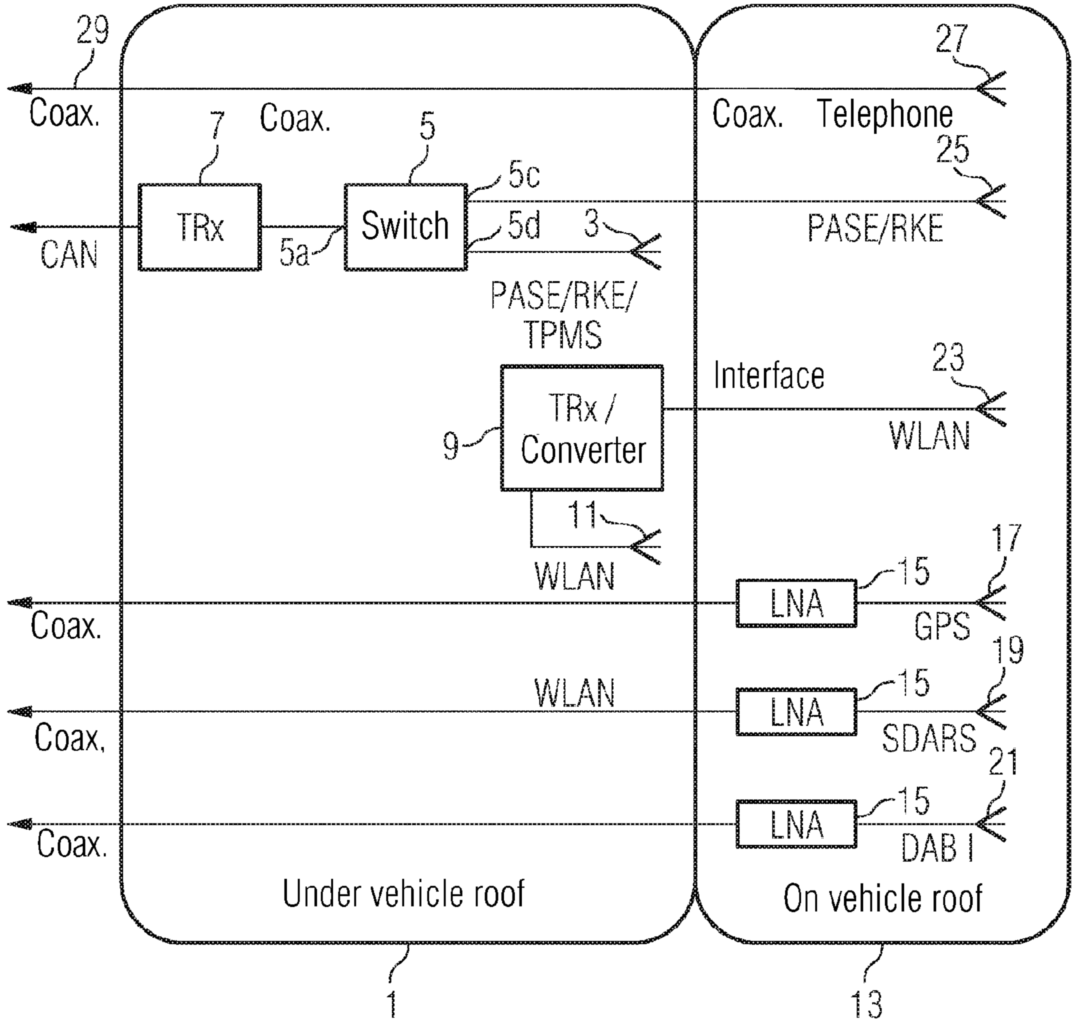
FIG. 1 a block diagram of the conventional circuit of vehicle antennas.

The use of one and the same antenna for at least two services according to various embodiments, preferably of the same frequency range or frequency band, allows an additional antenna which would otherwise be necessary, for example a mobile radio antenna, to be saved.

To this end signals are transmitted and/or received via a first antenna depending on a detectable event for the at least one first or second service preferably with a long-range of several kilometers, especially 1 km to 3 km.

In an embodiment the first antenna involves an external antenna on the vehicle via which signals of at least two services, for example a mobile telephone service and as the second service an access control service in which part of the communication of an ID transmitter is undertaken with the vehicle-side control device or the transmit and receive device in the same RF frequency range or in substantially the same frequency band (and least overlapping bands) as with communication with a mobile telephone (GSM band) can be transmitted and/or received.

In a further embodiment the result of the query as to whether an authorized person is in the vehicle is used as a detectable event. This only allows the mobile telephone service for example to be used via the external vehicle antenna or to be switched on via a controllable switch or the transmit and receive device responsible for this to be connected to this antenna via the controllable switch if an authorized person has been detected as being present in the vehicle.

Such detection of an authorized person in the vehicle can be undertaken for example by a localization of an electronic key or ID generator, typically by means of known systems and methods, such as signal delay measurement, signal level measurement or also via other communication paths with a short-range, especially LF ranges which only cover the interior space or through other sensors or events in the vehicle such as seat sensors, opening the vehicle door, switching on the interior lighting etc.

In this state on the other hand any further service such as an RF radio link of an access control system service can be switched off by means of the controllable switch or the corresponding transmit and receive device can be uncoupled or disconnected by means of the controllable switch from the external vehicle antenna, so that in relation to this, no signals will be transmitted or received via the external vehicle antenna.

If on the other hand no authorized person is detected in the vehicle only signals of the access control system service can be transmitted and/or received via the external vehicle antenna, with the transmit and receive device responsible for this being connected or coupled by means of the controllable switch to the first antenna and by contrast the other service or services being switched off or uncoupled or disconnected by means of the controllable switch from the first antenna.

In a further embodiment signals of the least one first or second service, of which signals are not transmitted and/or received as a function of the detectable event via the first, for example external antenna, are transmitted and/or received via a second antenna within the vehicle for example.

In an embodiment a mobile telephone service is used as a first service and a monitoring and/or keyless entry systems service (PASS, RKE) as the second service, with the signals of the telephone service (GSM bands, UMTS) at least not permanently being transmitted and/or received via the first antenna and the telephone service being permanently switched on if an authorized person is present in the vehicle. This advantageously makes possible a localization or the registration of the mobile telephone to base stations lying in the area even if the actual mobile telephone service is switched off. For example the corresponding transmit and receive device can be briefly switched on for this purpose every few minutes (for a few seconds) or connected to the first antenna at specific.

Although in the previously described embodiment only one first service (mobile telephone service) and one second service (a monitoring and/or remote keyless entry system service) are used in relation to the first antenna, it is possible for more than two services to be able to be assigned to a (first) antenna. In particular it is conceivable in this case to prioritize the respective services depending on events such that depending on one or more detectable events in accordance with a prioritization a specific service for the transmission and/or receipt of signals can be exclusively assigned to the one shared (first) antenna. In other words for example the use of the shared (first) antenna by a currently active service can be interrupted or even entirely aborted by a specific or higher-ranking detectable event, so that a higher-priority or higher-ranking service can now use the shared (first) antenna for transmitting and/or receiving signals.

Such a high-priority or higher-ranking service can for example be a so-called E-call (emergency call) service. A vehicle supporting E-call automatically makes an emergency call after an accident to the closest emergency services center (which is accessible throughout Europe on a uniform number). The trigger for the sending out of an emergency call by a vehicle is in this case the receipt of an E-call trigger signal by a vehicle-side emergency call device, with the trigger signal able to be generated by crash sensors which detect a crash or accident of the vehicle or by a manually actuated key. The emergency call center automatically receives a precise location message (based on data of a satellite-based positioning systems such as GPS) from the vehicle and has the opportunity of speaking to the passengers in order to obtain further information about the severity of the accident.

In accordance with a further embodiment—based on a first and a second service using the shared (first) antenna—the E-call service can thus be seen as a third service which, on occurrence of a further detectable event, can exclusively use the shared (first) antenna for transmitting and/or receiving signals. The detection of an E-call trigger signal (by a vehicle-side emergency device or E-call device) can be seen as the further detectable event. For example in this context, as already described above, a first service can be formed by a mobile telephone service and a second service by a monitoring and/or keyless entry system service. In accordance with the above description, in normal operation of the motor-vehicle, if an (authorized) person is present in the vehicle, the mobile telephone service can use the shared (first) antenna for transmitting and/or receiving signals. If the vehicle now has an accident and if an E-call trigger signal is accordingly detected, any telephone conversation which might be in progress is stopped by this ("further detectable") event and the E-call is made. It is possible for the stopped telephone conversation to be resumed again after the issuing of the E-call.

In this case a method for transmitting and/or receiving signals is thus created, in which a plurality of services are able to be operated in a vehicle with a simply-constructed antenna module.

In accordance with a further aspect an antenna module is created especially for executing a method just presented with at least one first, especially vehicle-external antenna, with the antenna module featuring a controllable (changeover) switch which has at least one first and one second signal input respectively for an available service at least one first signal output which is connected or coupled to the first antenna, with the controllable switch having at least one first switch position in which the first signal output is only connected to the first signal input and at least one second switch position in which the first signal output is only connected to the second signal input.

Advantageously the antenna module has a second, especially vehicle-internal antenna connected or coupled to a second signal output of the changeover switch, whereby in one switch position of the switch, the first signal input is exclusively connected to the first antenna and the second signal input exclusively to the second antenna.

Furthermore the controllable switch can have a third signal input for the third available service, with the controllable switch also having a third switch position in which the first signal output is only connected to the third signal input.

For the antenna module it can be assumed in this case that the signal available at the first signal input is a mobile telephone service (first service) and that the service available at the second signal input is a monitoring and/or keyless entry system service (second service). The service available at the third signal input can involve an E-call service. If the antenna module receives the occurrence of an event (e.g. an accident) for prioritizing a service (e.g. the E-call service) via a data bus (CAN, LIN, . . . ), it can put the controllable switch into a corresponding switching position in order to guarantee an orderly execution of the (prioritized) service. In this case, triggered by a high-priority event of the switch (referred to above as a further detectable event) the switch, as described above, can be put into a third switching position in which the first signal output is only connected to the third signal input or to the third or prioritized service (E-call) assigned to this. It is however also conceivable for the controllable switch not to include any (own) third signal input for the third service. Instead after the occurrence of the event (for E-call service) the controllable switch is only put into the first switch position here in the example in which the first signal input is connected for the telephone service to the first signal output. This means that the first antenna is connected via the controllable switch to a line provided for telephone service, such as a coaxial cable for example. This coaxial cable must then further be connected via a coupler or a coupling device, which in the simplest case comprises a T-piece to which an E-call module or an E-call device executing the E-call service is connected.

The block diagram depicted in FIG. 1 shows an example known in practice relating to the circuit and the presence of a mobile telephone service and a long-range external area monitoring. The arrangement and circuit also shown in FIG. 1 corresponds in principle to the antenna module disclosed in the unpublished German patent application 10 2006 025 176.8.

In accordance with FIG. 1 the antenna module according to various embodiments consists of a lower part 1 which for example is arranged below a vehicle roof, especially in the rear central area, and an upper part 13, which is preferably arranged at the same point on the vehicle roof, for example in the form of a fin. The cables of the upper part lead via a through-contacting, for example a breakthrough of the roof in this area, into the lower part 1 of the antenna module, at which these lines are routed out by corresponding connections such as coax connections, bus connections etc. in order to be connected to further corresponding control devices present in the vehicle.

As can be seen from FIG. 1, arranged in the lower part 1 of the antenna module are both an antenna 3, for example in the form of an antenna with multiband capabilities for monitoring the exterior and interior (PASS), for monitoring the tire pressure (tire guard or Tire Pressure Monitoring System TPMS and as well as for the remote keyless entry (RKE) service and also a WLAN antenna 11.

The WLAN antenna 11 can be connected via a transceiver (TRx: Transmitter/Receiver) or converter, especially in the form of a repeater 9, to a WLAN antenna 23 in the upper part 13 of the antenna module so that a WLAN service available outside the vehicle can still be reached despite the screening of the vehicle in the interior via the internal WLAN antenna 11.

The antenna 3 with multiband capabilities is connected to an output 5*d* of a controllable switch 5. Furthermore an output 5*c* of the controllable switch 5 is connected to an antenna 25 which is likewise responsible for exterior monitoring, especially with a long range, but also for the keyless entry system. The different services via antenna 3 and antenna 25 can be connected via the controllable switch 5 to an input 5*a* and a transceiver 7 present at this input, so that the services can be operated alternately, especially in the form of time division multiplexing, almost simultaneously overall. The transceiver device 7, as shown in FIG. 1, can be accessed bidirectionally via a corresponding connection of the antenna module to a vehicle bus such as CAN (Controller Area Network) or other bus systems. The coax connection 29 to the mobile radio antenna 27 is on the other hand likewise routed through to the upper part 13 of the antenna module like the further coax connections only shown by way of example via possible additional amplifiers 15 to the antennas additionally present in the upper part 13 of the module for GPS 17, for SDARS 19 and DAB 21.

Figure 2:
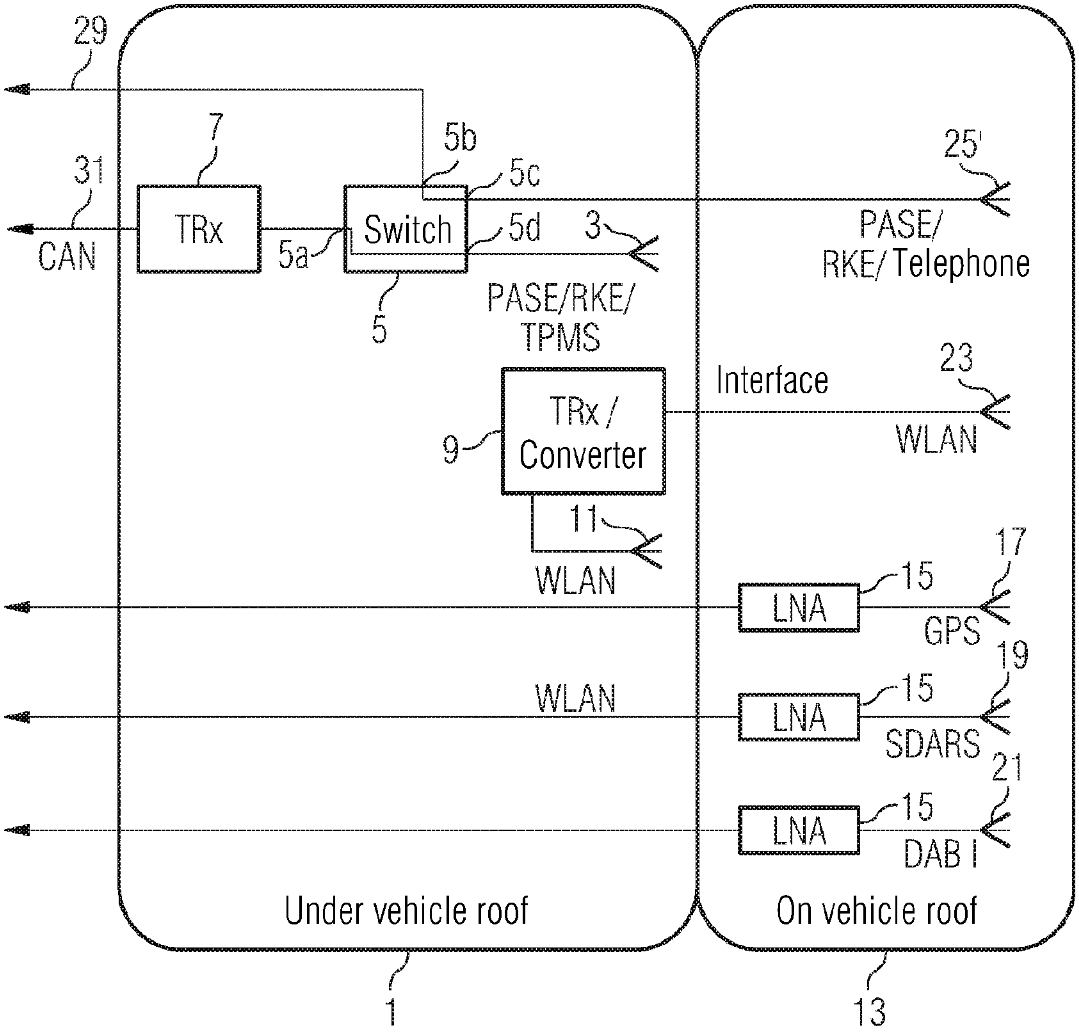
FIG. 2 a block diagram of a circuit of vehicle antennas in accordance with various embodiments in the event of an authorized person being present inside the vehicle and FIG. 3 a block diagram of a circuit of vehicle antennas in accordance with various embodiments in the event of the vehicle being empty.

It is evident from the block diagram in accordance with FIG. 2 how the two antennas 25 and 27 present in FIG. 1 can be replaced by a single antenna 25', here preferably in the upper part 13 of the antenna module. In the case depicted in FIG. 2 the coax connection 29 leads via an input 5*b* of the controllable switch 5 and is connected in this case with an output 5*c* to the antenna 25', so that the antenna 25 in this case only transmit signals of the mobile telephone service.

Figure 3:
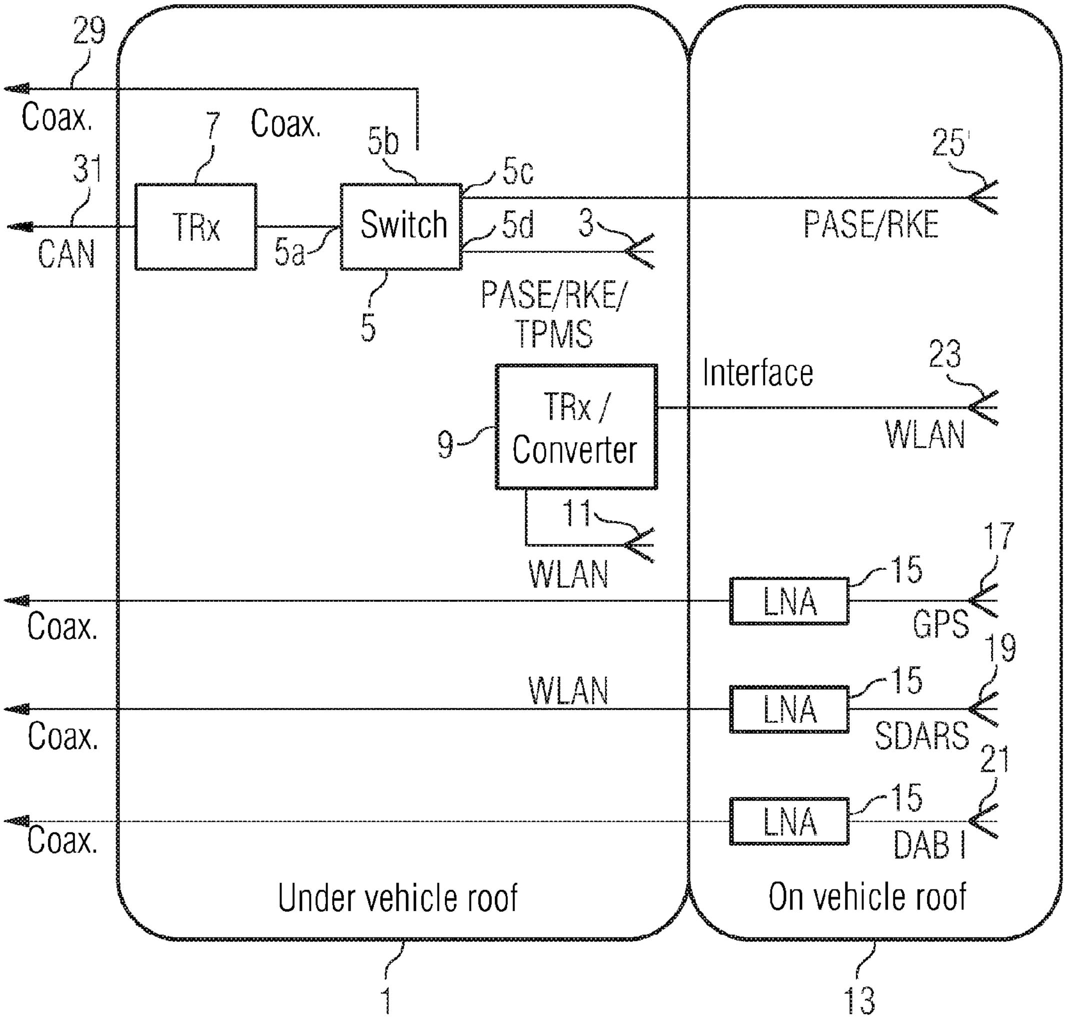

In the case depicted in FIG. 3 on the other hand the coax connection 25 of the telephone service is disconnected from the antenna 25' by the controllable switch 5, as shown symbolically, with the antenna 25' in this case depicted in FIG. 3 being connected alternately by the controllable switch 5 to the input 5*a* and the transceiver and 7 connected to it. Accordingly in this case no mobile telephone service is possible, but both via the antenna 3 and also especially via the antenna 25, an exterior monitoring over a long-range as well as the remote keyless entry service (RKE) and also additionally the tire guard service via antenna 3. These services can be provided wholly or partly in time division multiplexing or frequency division multiplexing via antenna 3 and antenna 25 simultaneously or at least quasi-simultaneously.

Apart from the differences explained above, the block diagrams in accordance with FIG. 2 and FIG. 3 correspond to the previously explained block diagram in accordance with FIG. 1, with the further services such as WLAN, GPS, SDARS, DAB only being shown by way of example for the sake of completeness, without restricting the invention.

If an event, such as for example "authorized person is located within the vehicle" is detected, the controllable switch 5 is put into its switch position shown in FIG. 2 so that the antenna 25' is responsible for the mobile radio telephone service. Exterior monitoring as well as access control is then still undertaken via the internal antenna 3 which in this case is connected permanently to the transceiver 7 via input 5*a*. The event "authorized person is located within the vehicle" can be typically triggered in this case by the remote keyless entry system, by the exterior and interior monitoring, namely especially by a localization of the location of the ID generator, by a seat sensor being triggered, by a sensor that detects the opening of the vehicle door or of the central locking, by a deactivation of the immobilizer etc.

If such an event is not detected, the controllable switch remains in its switch position shown in FIG. 3 in which the antenna 25' is disconnected from the telephone coax cable 29 and preferably the controllable switch carries out time division multiplexing or switching diversity and connects the antennas 3 and 25' or the outputs 5*d* and 5*c* alternately to the input 5*a* and thereby to the transceiver 7.

As shown in FIG. 2 and FIG. 3 in this way it is possible to save on an especially constructionally larger antenna for long distances and without significantly degrading functions and replace it by a single antenna 25', since the linkage according to various embodiments to the corresponding event means that the services needed in each case remain guaranteed. This simultaneously removes the antenna coupling problems which, especially with services using the same frequency band, represent a large problem.

In accordance with various embodiments, as only explained by way of example above, at least one antenna is saved and the problem of coupling is resolved. By comparison with known systems this results in an improved system performance.

What is claimed is:

1. A method for transmitting and/or receiving signals for multiple different types of services via a first antenna internal to a vehicle and a second antenna external to the vehicle, the method comprising:

setting a switch to a first configuration in which both the first antenna internal to the vehicle and the second antenna external to the vehicle are connected to a first communication path in a shared manner, and in which both the first and second antennas are configured to transmit and/or receive signals of a first type of service via the first, shared communication path, automatically detecting a detectable event, and in response to detecting the detectable event, automatically setting the switch to second configuration in which (a) the first antenna internal to the vehicle is connected to the first communication path and configured to transmit and/or receive signals of the first type of service via the first communication path, and (b) the second antenna external to the vehicle is connected to a second communication path and configured to transmit and/or receive signals of a second type of service via a second communication path, the second type of service being different than the first type of service.

2. The method according to claim 1, wherein the result of a query as to whether an authorized person is in the vehicle is used as the detectable event.

3. The method according to claim 1, wherein signals of the at least one first or second service, of which the signals, as a function of the detectable event, are not transmitted and/or received via the first antenna, are transmitted and/or received via the second antenna.

4. The method according to claim 1, wherein the signals of the at least one first and second services essentially use the same frequency range.

5. The method according to claim 1, wherein a mobile telephone service is used as the first service and an access control system service is used as the second service, with the signals of the telephone service at least not being permanently transmitted and/or received via the first vehicle antenna if an authorized person is not located in the vehicle and the telephone service being permanently switched on when an authorized person is located in the vehicle.

6. The method according to claim 1, wherein a third service is connected to the at least one first antenna such that, on occurrence of a further detectable event the at least one first antenna exclusively transmits and/or receives signals for the third service.

7. The method according to claim 6, wherein an E-call service is used as the third service.

8. The method according to claim 1, wherein the detection of an accident occurring to the vehicle is used as the further detectable event.

9. The method according to claim 1, comprising, with the switch in the first configuration, multiplexing signals transmitted and/or received by the first and second antennas onto the shared first communication path.

10. An antenna module for carrying out a method for transmitting and/or receiving signals for multiple different types of services in a vehicle, comprising:

a first antenna internal to the vehicle and configured transmit and/or receive signals for a first type of service, second antenna external to the vehicle and configured to transmit and receive signals for the first type of service or a second type of service, depending on the setting of a controllable switch, the controllable switch being switchable, based on the presence of a detectable event, between:

(a) a first configuration in which both the first antenna internal to the vehicle and the second antenna external to the vehicle are connected to a first communication path for transmitting and/or receiving signals of a first type of service via the first communication path, and (b) a second configuration in which (a) the first antenna internal to the vehicle is connected to the first communication path and configured to transmit and/or receive signals of the first type of service via the first communication path, and (b) the second antenna external to the vehicle is connected to a second communication path and configured to transmit and/or receive signals of a second type of service via a second communication path, the second type of service being different than the first type of service.

11. The antenna module according to claim 10, wherein the antenna module has a second antenna connected or coupled to a second signal output of the switch whereby, in a switch position of the switch, the first signal input is exclusively connected to the first antenna and the second signal input is exclusively connected to the second antenna.

12. The antenna module according to claim 10, wherein the controllable switch comprises a third signal input for a third available service, whereby the controllable switch also has a third switch position in which the first signal output is only connected to the third signal input.

13. The antenna module according to claim 10, wherein a module for executing the third service is also connected via a coupling device to the first signal input, so that in the first switch position the first signal output is connected to the first signal input.

14. The antenna module according to claim 10, wherein the antenna module is configured to use the result of a query as to whether an authorized person is in the vehicle as the detectable event.

15. The antenna module according to claim 10, wherein the antenna module is configured to transmit and/or receive signals of the at least one first or second service which, as a function of the detectable event, are not transmitted and/or received via the first antenna, via the second antenna.

16. The antenna module according to claim 10, wherein the signals of the at least one first and second services essentially use the same frequency range.

17. The antenna module according to claim 10, wherein the antenna module is configured to use a mobile telephone service as the first service and an access control system service as the second service, with the signals of the telephone service at least not being permanently transmitted and/or received via the first vehicle antenna if an authorized person is not located in the vehicle and the telephone service being permanently switched on when an authorized person is located in the vehicle.

18. The antenna module according to claim 10, wherein a third service is connected to the at least one first antenna such that, on occurrence of a further detectable event the at least one first antenna exclusively transmits and/or receives signals for the third service.

19. The antenna module according to claim 18, wherein an E-call service is used as the third service.

20. The antenna module according to claim 10, wherein the switch is configured, in the first configuration of the switch, to multiplex signals transmitted and/or received by the first and second antennas onto the shared first communication path.

* * * * *